(12) United States Patent
Katrak et al.

(10) Patent No.: US 8,538,622 B2
(45) Date of Patent: Sep. 17, 2013

(54) REDUNDANT DEVICE POSITIONING SENSING SYSTEM FOR A VEHICLE

(75) Inventors: Kerfegar K. Katrak, Fenton, MI (US); John N. Stockbridge, Novi, MI (US)

(73) Assignee: GM Global Technology Operations LLC

( * ) Notice: Subject to any disclaimer, the term of this patent is extended or adjusted under 35 U.S.C. 154(b) by 1208 days.

(21) Appl. No.: 11/060,973

(22) Filed: Feb. 18, 2005

(65) Prior Publication Data

US 2006/0190142 A1 Aug. 24, 2006

(51) Int. Cl.
*G06F 11/16* (2006.01)

(52) U.S. Cl.
USPC ............. 701/29.7; 701/33.7; 701/36; 701/49; 701/70

(58) Field of Classification Search
USPC ................... 701/1, 29, 34, 36, 49, 67, 70, 93, 701/99, 101, 103, 110, 114; 123/319, 337, 123/339.12, 339.14, 361, 363, 376, 350; 74/479.01, 482
See application file for complete search history.

(56) References Cited

U.S. PATENT DOCUMENTS

| | | | | |
|---|---|---|---|---|
| 2,539,616 A | * | 1/1951 | Gehman | 701/207 |
| 2,646,924 A | * | 7/1953 | Schuck | 701/204 |
| 5,035,836 A | * | 7/1991 | Gardos et al. | 252/511 |
| 5,073,865 A | * | 12/1991 | Togai et al. | 701/103 |
| 5,260,877 A | * | 11/1993 | Drobny et al. | 701/114 |
| 5,602,732 A | * | 2/1997 | Nichols et al. | 701/29 |
| 6,089,535 A | * | 7/2000 | Mizutani et al. | 251/129.04 |
| 6,392,527 B1 | * | 5/2002 | Gilano et al. | 338/2 |
| 6,414,607 B1 | * | 7/2002 | Gonring et al. | 341/20 |
| 2002/0193935 A1 | * | 12/2002 | Hashimoto et al. | 701/110 |
| 2004/0064230 A1 | * | 4/2004 | Takafuji et al. | 701/45 |

FOREIGN PATENT DOCUMENTS

| | | |
|---|---|---|
| DE | 4004085 A1 | 8/1991 |
| DE | 4235880 A1 | 4/1994 |
| DE | 19642174 A1 | 4/1998 |
| DE | 19756924 A1 | 6/1998 |

* cited by examiner

*Primary Examiner* — Khoi Tran
*Assistant Examiner* — Spencer Patton

(57) ABSTRACT

A redundant position sensing system includes a device having a position between minimum and maximum positions. First and second sensor modules include first and second sensor resistances. A value of one of the first or second sensor resistances increases and a value of the other of the first or second resistances decreases when the device moves from the minimum position to the maximum position. A maximum value of the first sensor resistance ranges between a first maximum value and a second maximum value that is greater than the first maximum value due to a first manufacturing tolerance. A maximum value of the second sensor resistance ranges between a third maximum value and a fourth maximum value that is greater than the third maximum value due to a second manufacturing tolerance. The second maximum value is less than the third maximum value.

12 Claims, 8 Drawing Sheets

| Parameter | Min. (Ω) | Nom. (Ω) | Max. (Ω) | Tol. - Nom. (%) | Ratio to TPS 1/2 |
|---|---|---|---|---|---|
| TPS1 Sensor Resistance | 2700 | 3300 | 3900 | 18.18 | 1.50 |
| TPS1 Sensor Mid-point Resistance | 1350 | 1650 | 1950 | N/A | 1.50 |
| TPS1 Series Resistance | 1200 | 1500 | 1800 | 20.0 | 2.11 |
| TPS2 Sensor Resistance | 1800 | 2200 | 2600 | 18.18 | .67 |
| TPS2 Sensor Mid-point Resistance | 900 | 1100 | 1300 | N/A | .67 |
| TPS2 Series Resistance | 570 | 750 | 930 | 24.0 | .48 |
| Contact Resistance | 150 | N/A | 1500 | N/A | |

FIG. 5

| Parameter | Min. (Ω) | Nom. (Ω) | Max. (Ω) | Tol. - Nom. (%) | Ratio to TPS 1/2 |
|---|---|---|---|---|---|
| TPS1 Sensor Resistance | 2000 | 2500 | 3000 | 20.0 | 0.50 |
| TPS1 Sensor Mid-point Resistance | 1000 | 1250 | 1500 | N/A | 0.50 |
| TPS1 Series Resistance | 600 | 750 | 900 | 20.0 | 0.50 |
| TPS2 Sensor Resistance | 4000 | 5000 | 6000 | 20.0 | 2.0 |
| TPS2 Sensor Mid-point Resistance | 2000 | 2500 | 3000 | N/A | 2.0 |
| TPS2 Series Resistance | 1200 | 1500 | 1800 | 20.0 | 2.0 |
| Contact Resistance | 150 | N/A | 2500 | N/A | |

FIG. 6 ved, the control module 14 compares the values of the first
REDUNDANT DEVICE POSITIONING SENSING SYSTEM FOR A VEHICLE

FIELD OF THE INVENTION

The present invention relates to vehicle control systems, and more particularly to redundant position sensing of devices in vehicle control systems.

BACKGROUND OF THE INVENTION

Vehicle manufacturers are increasingly replacing mechanical linkages in vehicles with sensors and electromechanical devices to reduce weight and cost. For example, sensors are replacing mechanical linkages to detect positions of user operated devices such as accelerator, clutch, and brake pedals. Signals are transmitted from the sensors to controllers and/or electromechanical devices in the vehicle. For example, a signal from an accelerator pedal may be transmitted to an actuator in the electronic throttle body to adjust the position of the throttle blade. Additionally, a throttle position sensor detects the position of the throttle blade and transmits a signal to an engine control module.

In cases where mechanical linkages are at least partially eliminated, multiple sensors are commonly used to perform redundant measurements and ensure system accuracy. For example, some manufacturers use analog position sensors that are based on a resistive ink or paste that is deposited on a non-conducting substrate. Other manufacturers use application specific integrated circuits (ASICs) in combination with sensors. The sensors typically include hall effect or inductively coupled sensors. The ASICs receive analog signals from the sensors and output pulse width modulated (PWM) or other types of signals.

Referring to FIG. 1, a vehicle control system 10 includes a throttle body 12 and a control module 14. The throttle body 12 includes first and second sensor modules 16 and 18, respectively, that communicate with the control module 14. The throttle body 12 also includes a throttle blade 20 that is in mechanical contact with the sensor modules 16 and 18. The sensor modules 16 and 18 are potentiometer-based sensors 16 and 18 that include adjustable sensor resistances. During normal operations, the throttle blade 20 moves between a minimum position and a maximum position. For example, the minimum position may be an idle throttle position, and the maximum position may be a wide-open throttle (WOT) position. As the throttle blade 20 moves between the minimum and maximum positions, mechanical contacts 22 between the throttle blade 20 and the sensor modules 16 and 18 adjust the values of the sensor resistances.

The first and second sensor modules 16 and 18 generate first and second position signals 24 and 26, respectively, based on the values of respective sensor resistances. The sensor modules 16 and 18 transmit the position signals 24 and 26 to the control module 14. The control module 14 determines first and second positions of the throttle blade 20 based on values of the position signals 24 and 26. For example, the control module 14 may store values of the position signals 24 and 26 when the throttle blade 20 is set at predetermined positions during a calibration process. This allows the control module 14 to determine the values of the position signals 24 and 26 by scaling between the preset values. The multiple positions of the throttle blade 20 allow the control module 14 to perform redundancy testing and to verify the integrity of the sensor modules 16 and 18.

In the event of an electrical short-circuit between the first and second sensor modules 16 and 18, respectively, one or both of the values of the position signals 24 and 26 may become invalid, which adversely affects vehicle control. In one approach, the first sensor module 16 includes a short-circuit switch 28. When activated by the control module 14, the short-circuit switch 28 sets the value of the first position signal 24 to a predetermined value. For example, the value of the first position signal 24 may be set by shorting the sensor resistance of the first sensor module 16 to a reference or ground potential. While the short-circuit switch 28 is activated, the control module 14 compares the values of the first and second position signals 24 and 26, respectively. If the difference between the values of the position signals 24 and 26 is less than a predetermined value, it is likely that a short-circuit condition exists between the sensor modules 16 and 18 and the control module 14 may activate an alarm indicator.

The short-circuit switch 28 allows the control module 14 to periodically detect a short-circuit condition between the sensor modules 16 and 18. However, the accuracy of the position signal values are compromised while the short-circuit switch 28 is activated. This interrupts other system diagnostics that utilize the values of the position signals 24 and 26 from the sensor modules 16 and 18. Additionally, the short-circuit switch 28 provides added cost and complexity to the sensor modules 16 and 18.

SUMMARY OF THE INVENTION

A redundant position sensing system according to the present invention includes a device having a position between minimum and maximum positions. First and second sensor modules include first and second sensor resistances, respectively. A value of one of the first or second sensor resistances increases and a value of the other of the first or second resistances decreases when the device moves from the minimum position to the maximum position. A maximum value of the first sensor resistance ranges between a first maximum value and a second maximum value that is greater than the first maximum value due to a first manufacturing tolerance. A maximum value of the second sensor resistance ranges between a third maximum value and a fourth maximum value that is greater than the third maximum value due to a second manufacturing tolerance. The second maximum value is less than the third maximum value.

In other features, a control module communicates with the first and second sensor modules. The first and second sensor modules generate first and second position values based on the first and second sensor resistances, respectively. The sensor module determines first and second positions of the device based on the first and second position values, respectively. First and second conductors have first ends that communicate with the first and second sensor modules, respectively, and second ends that communicate with the control module. The first sensor module transmits the first position value on the first conductor and the second sensor module transmits the second position value on the second conductor. The control module compares the first and second position values and activates an alarm indicator when a difference between the first and second position values is less than a predetermined value.

In still other features of the invention, the control module compares the first and second positions of the device and activates an alarm indicator when a difference between the first and second positions is greater than a predetermined value. The control module converts the first and second positions of the device into first and second normalized values, respectively, that represent a fraction of a range between the minimum and maximum positions of the device. The control module compares the first and second normalized values and activates an alarm indicator when a difference between the first and second normalized values is greater than a predetermined value.

In yet other features, the control module utilizes only the first position value for system control during normal operations and when no alarm indicators are activated. The first and second manufacturing tolerances are approximately equal to 20%. A ratio of the first maximum value of the first sensor resistance to the third maximum value of the second sensor resistance is less than or equal to 0.5. The first and second sensor resistances are generated by a resistive ink deposition process. First ends of the first and second sensor resistances communicate with a supply potential and second ends of the first and second sensor resistances communicate with a ground potential.

In still other features of the invention, the first and second sensor modules include first and second series resistances, respectively, first ends of the first and second series resistances communicate with adjustable ends of the first and second sensor resistances, and the first and second series resistances generate the first and second position values, respectively. The first and second position values are based on a voltage that is applied to the first and second sensor resistances and based on first and second combined resistances, respectively. The first and second combined resistances include the first and second sensor resistances, the first and second series resistances, and first and second contact resistances that are generated at the adjustable ends of the first and second sensor resistances, respectively.

In yet other features, the first and second series resistances have manufacturing tolerances that are approximately equal to 20%. A ratio of a value of the first series resistance to a value of the second series resistance is less than or equal to 0.5. Minimum values of the first and second sensor resistances are set greater than or equal to 7% of the first maximum value of the first sensor resistance and the third maximum value of the second sensor resistance, respectively. The device is one of an accelerator pedal, a brake pedal, a clutch pedal, or a throttle blade of a vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a table that illustrates first exemplary values of resistors in the throttle position sensors of FIG. 3;

FIG. 6 is a table that illustrates second exemplary values of resistors in the throttle position sensors of FIG. 3;

DETAILED DESCRIPTION OF THE PREFERRED EMBODIMENTS

Figure 1:
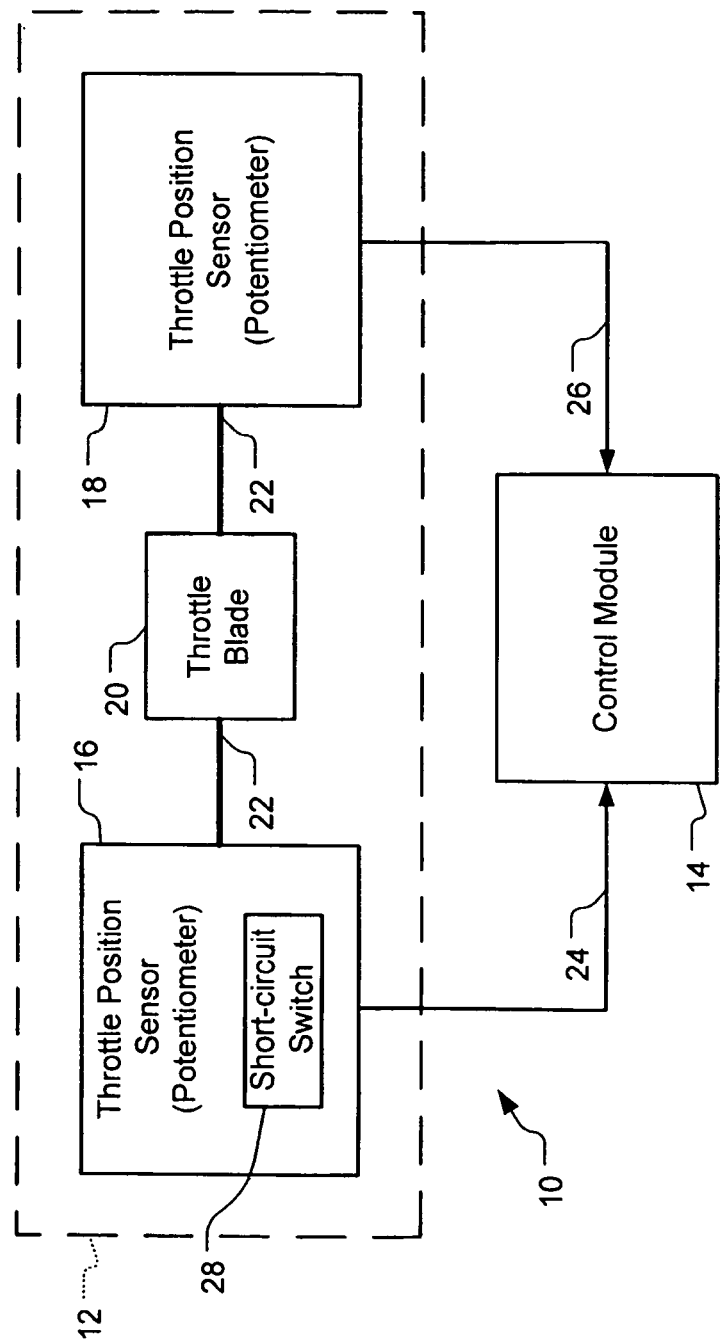
FIG. 1 is a functional block diagram of a throttle body and a control module in a vehicle control system that performs redundant position sensing according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
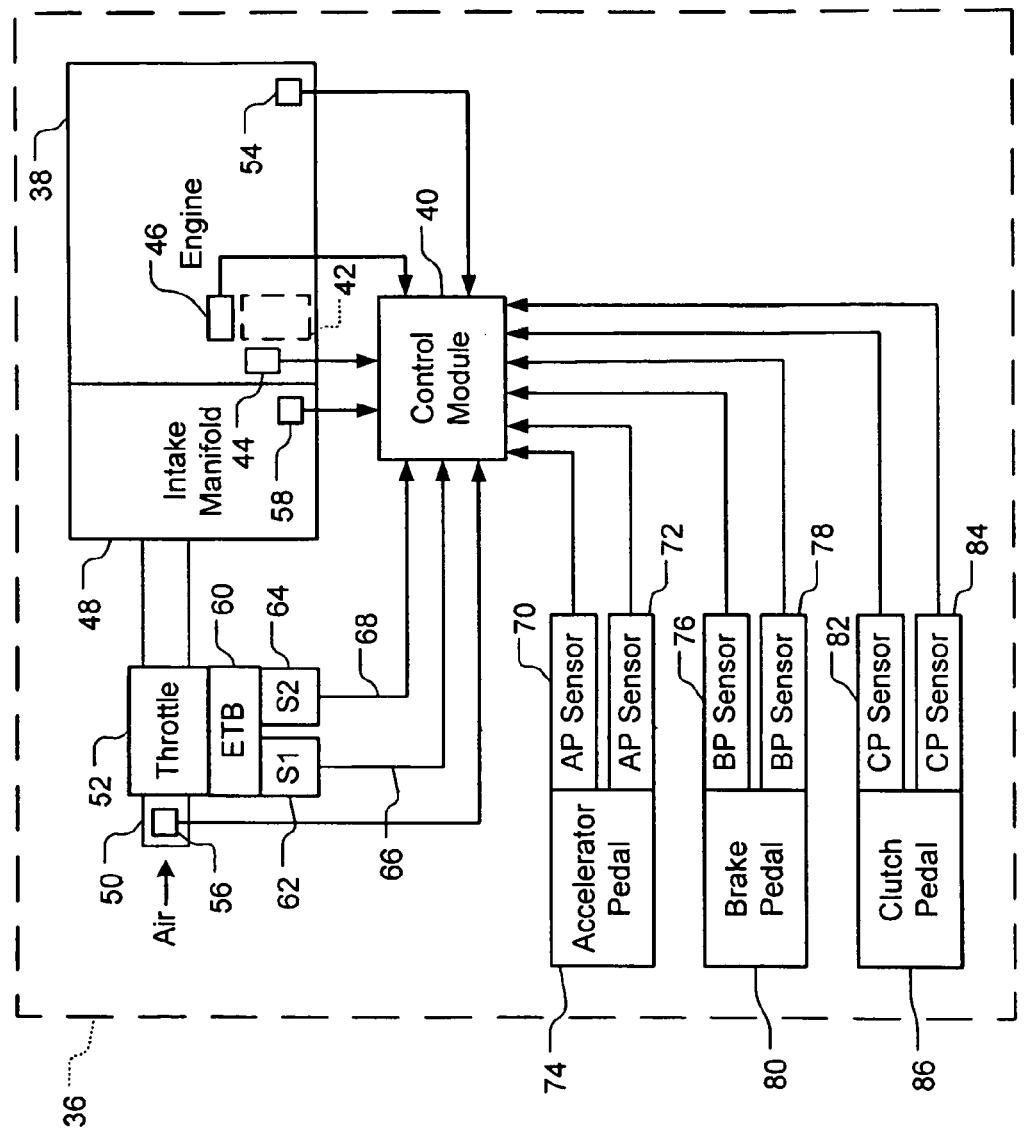
FIG. 2 is a functional block diagram of a vehicle control system including a control module that receives signals from vehicle sensors according to the present invention.

Referring now to FIG. 2, a vehicle 36 includes an engine 38 and a control module 40. The engine 38 includes a cylinder 42 that has a fuel injector 44 and a spark plug 46. Although a single cylinder 42 is shown, those skilled in the art can appreciate that the engine 38 typically includes multiple cylinders 42 with associated fuel injectors 44 and spark plugs 46. For example, the engine 38 may include 4, 5, 6, 8, 10, 12, or 16 cylinders 42.

Air is drawn into an intake manifold 48 of the engine 38 through an inlet 50. A throttle blade 52 regulates air flow through the inlet 50. Fuel and air are combined in the cylinder 42 and are ignited by the spark plug 46. The throttle blade 52 controls the rate that air flows into the intake manifold 48. The control module 40 adjusts the rate that fuel is injected into the cylinder 42 based on the air that is flowing into the cylinder 42 to control the air/fuel (A/F) ratio within the cylinder 42. The control module 40 communicates with an engine speed sensor 54 that generates an engine speed signal. The control module 40 also communicates with mass air flow (MAF) and manifold absolute pressure (MAP) sensors 56 and 58, respectively, which generate MAF and MAP signals, respectively.

The engine 38 includes an electronic throttle body (ETB) 60 that is associated with the throttle blade 52. The ETB 60 is controlled by the control module 40 and/or a dedicated controller such as an electronic throttle controller (ETC). First and second throttle position sensors 62 and 64, respectively, detect a position of the throttle blade 52 in the ETB 60 and generate first and second position signals 66 and 68, respectively, that represent the position of the throttle blade 52. The first and second throttle position sensors 62 and 62, respectively, transmit the first and second position signals 66 and 68, respectively, to the control module 40.

The vehicle 36 optionally includes first and second accelerator pedal (AP) position sensors 70 and 72, respectively, that detect a position of the AP 74. The first and second AP position sensors 70 and 72, respectively, generate first and second position signals that represent the position of the AP 74. The first and second AP position sensors 70 and 72, respectively, transmit the first and second position signals to the control module 40. The vehicle 36 also optionally includes first and second brake pedal (BP) position sensors 76 and 78, respectively, that detect a position of the BP 80. The first and second BP position sensors 76 and 78, respectively, generate first and second position signals that represent the position of the BP 80. The first and second BP position sensors 76 and 78, respectively, transmit first and second position signals to the control module 40.

In the case of a manual transmission, the vehicle 36 optionally includes first and second clutch pedal (CP) position sensors 82 and 84, respectively, that detect a position of the CP 86. The first and second CP position sensors 82 and 84, respectively, generate first and second position signals that represent the position of the CP 86. The first and second CP position sensors 82 and 84, respectively, transmit the first and second position signals to the control module 40. Those skilled in the art can appreciate that sensors other than those shown in FIG. 2 may be employed. Additionally, the control module 40 may receive position signals from more than two position sensors for added redundancy.

It is possible to utilize only the first throttle position sensor 62 and still obtain redundant measurements of the position of the throttle blade 52. For example, other sensors such as the MAF and MAP sensors 56 and 58, respectively, indicate a flow rate and/or a pressure of the air in the intake manifold 48 that may be used to determine a position of the throttle blade 52. In this case, the control module 40 receives only the position signal from the first throttle position sensor 62. However, it is difficult to accurately compare the position of the throttle blade 52 from the first throttle position sensor 62 and from the MAF and/or MAP sensors 56 and 58, respectively, in both static and dynamic vehicle 36 conditions. Regardless of the availability of other sensors, it is desirable to utilize both the first and second AP position sensors 70 and 72, respectively. A failure of a single AP position sensor 70 or 72 would result in a single-point failure and prevent the control module 40 from accurately detecting a position of the AP 74.

The control module 40 determines a position of a device in the vehicle 36 based on values of respective first and second position signals. In an exemplary embodiment, the control module 40 converts the position values into normalized values that represent a fraction of a range between minimum and maximum positions. For example, a normalized position value for the throttle blade 52 may represent a fraction of the range between an idle throttle position and a wide-open throttle (WOT) position.

In this case, a normalized position value of 0% may correspond with the idle throttle position and a normalized position value of 100% may correspond with the WOT position. For example, in an exemplary embodiment, positions of the vehicle devices are fixed during a calibration process so that the position sensors output position signals with predetermined values. For example, the first and second throttle position sensors 62 and 64, respectively, may be preset to output position signals with predetermined values when the throttle blade 52 is fixed at a maximum airflow throttle position. The control module 40 may then scale values of the position signals between the preset position value and a position value that is learned during normal operations to determine a position of the throttle blade 52.

Figure 3:
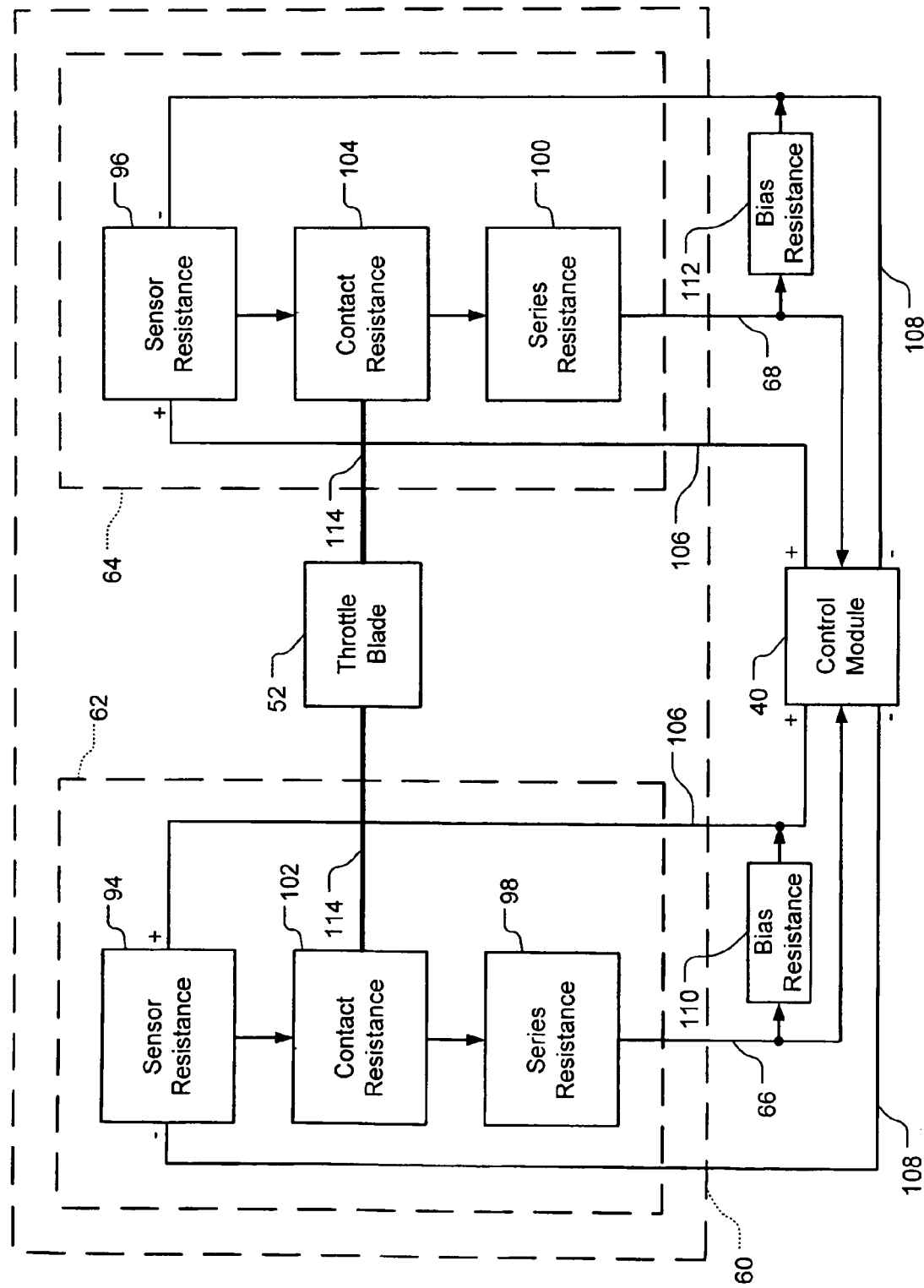
FIG. 3 is a functional block diagram of a control module and a throttle body that includes throttle position sensors for redundant position sensing in a vehicle control system according to the present invention.

Referring now to FIG. 3, the ETB 60 and the control module 40 are illustrated in further detail. An exemplary embodiment of the present invention is outlined below with respect to position sensing of the throttle blade 52. However, analogous operation of the throttle position sensors 62 and 64 and the control module 40 is contemplated with respect to position sensing of other vehicle devices including the accelerator pedal 74, the brake pedal 80, and the clutch pedal 86. In an exemplary embodiment, the first and second throttle position sensors 62 and 64, respectively, and the throttle blade 52 are contained within the ETB 60.

The throttle position sensors 62 and 64 are potentiometer-based sensors 62 and 64 and include first and second sensor resistances 94 and 96, respectively. For example, each of the sensor resistances 94 and 96 may include first and second terminals and an adjustable terminal. A position of an adjustable terminal determines a fraction of the maximum resistance of a sensor resistance that is detected at the adjustable terminal. The position signals 66 and 68 that are generated by the throttle position sensors 62 and 64 have values based on the positions of the adjustable terminals.

The first and second throttle position sensors 62 and 64, respectively, also include first and second series resistances 98 and 100, respectively. The series resistances 98 and 100 communicate with respective adjustable terminals of the sensor resistances 94 and 96 and generate the position signals 66 and 68. In an exemplary embodiment, the sensor resistances 94 and 96 and the series resistances 98 and 100 are generated by a resistive ink deposition process. For example, resistive ink may be deposited on a non-conducting substrate to generate the resistances.

Contact resistances 102 and 104 are typically generated between the adjustable terminals and internal resistive surfaces of the sensor resistances 94 and 96. For example, a wiper contact of an adjustable terminal may include one or more brushes that contact an internal resistive surface that is generated by ink deposition. A contact resistance 102 or 104 that may vary over time is generated between the brushes and the resistive surface. Therefore, the contact resistances 102 and 104 affect the values of the position signals 66 and 68 generated by the throttle position sensors 62 and 64. First and second contact resistances 102 and 104, respectively, in the first and second throttle position sensors 62 and 64, respectively, are diagrammatically indicated in FIG. 3.

The first terminals of the sensor resistances 94 and 96 communicate with a supply potential 106 that is generated by the control module 40. The second terminals of the sensor resistances 94 and 96 communicate with a ground potential 108 that is also generated by the control module 40. The applied voltages 106 and 108 generate current through the sensor resistances 94 and 96, contact resistances 102 and 104, and series resistances 98 and 100. Positions of the adjustable terminals in the sensor resistances 94 and 96 determine the voltage that is produced at the output of the series resistances 98 and 100 and transmitted to the control module 40. A first bias resistance 110 communicates with the first series resistance 98 and the supply potential 106, and a second bias resistance 112 communicates with the second series resistance 100. For example, the first and second bias resistances 110 and 112, respectively, may be pull-up and pull-down resistors that are included in the control module 40.

The throttle blade 52 is in mechanical contact with the throttle position sensors 62 and 64. Mechanical connections 114 between the throttle blade 52 and contact resistances 102 and 104 are diagrammatically shown in FIG. 3. However, in an exemplary embodiment, wiper contacts that contact the sensor resistances 94 and 96 are mechanically linked to the movement of the throttle blade 52. For example, as the throttle blade 52 moves between the minimum and maximum positions, positions of the adjustable terminals in the sensor resistances 94 and 96 are adjusted.

The positions of the adjustable terminals determine voltages that are detected at outputs of the series resistances 98 and 100 and transmitted to the control module 40 via the position signals 66 and 68. In an exemplary embodiment, the voltage that is detected at the output of the first series resistance 98 decreases as the throttle blade 52 moves between the idle throttle position and the WOT position. Simultaneously and at an identical rate, the voltage that is detected at the output of the second series resistance increases as the throttle blade 52 moves between the idle throttle and WOT positions.

Figure 4:
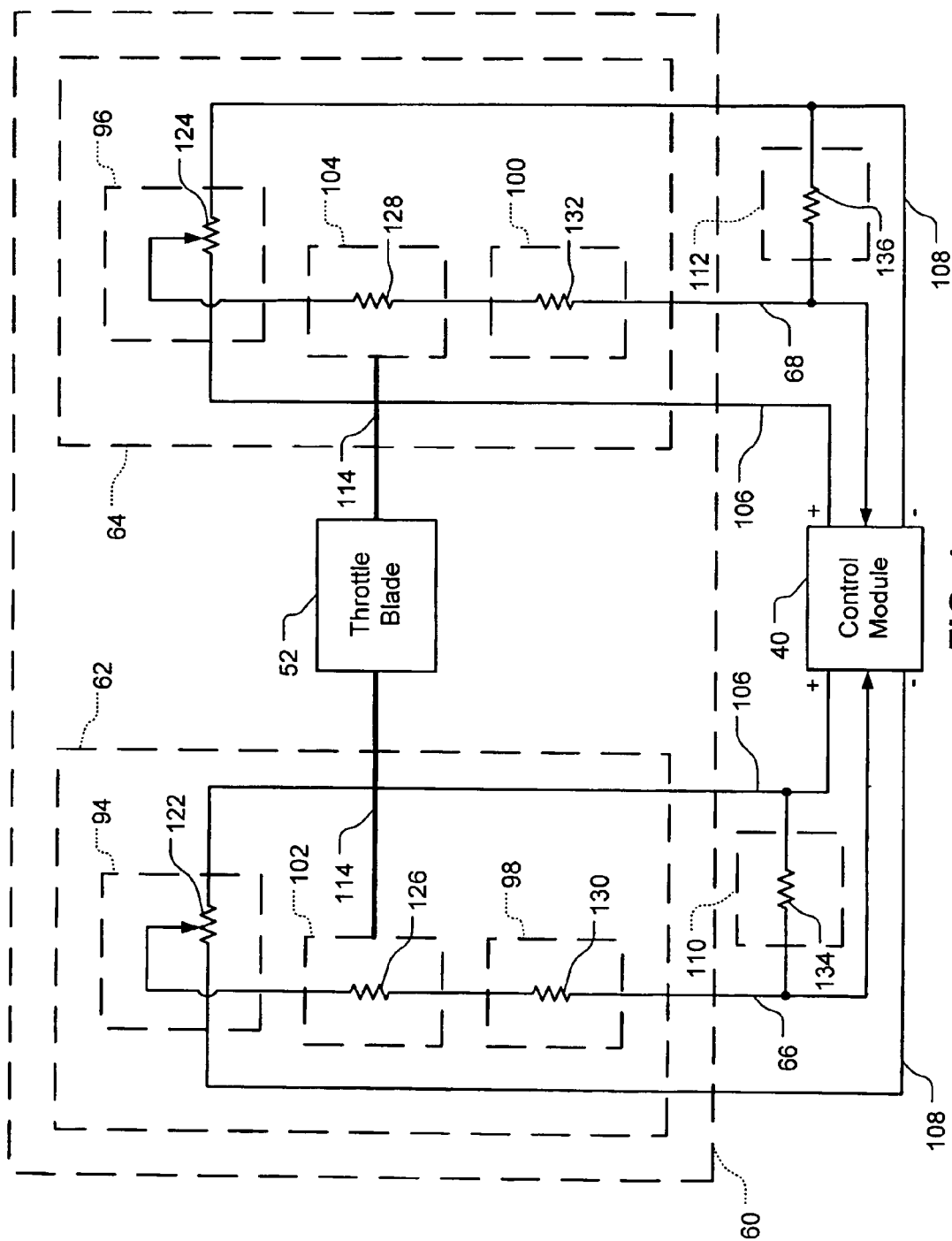
FIG. 4 is a functional block diagram and electrical schematic of the vehicle control system in FIG. 3 illustrated in further detail.

Referring now to FIG. 4, the first and second sensor resistances 94 and 96, respectively, include first and second adjustable resistors 122 and 124, respectively. First terminals of the adjustable resistors 122 and 124 communicate with the supply potential 106, and second terminals of the adjustable resistors 122 and 124 communicate with the ground potential 108. The first and second contact resistances 102 and 104, respectively, are diagrammatically indicated by first and second resistors 126 and 128, respectively. First ends of the first and second resistors 126 and 128, respectively, communicate with adjustable terminals of the adjustable resistors 122 and 124. The first and second series resistances 98 and 100, respectively, include third and fourth resistors 130 and 132, respectively. First ends of the third and fourth resistors 130 and 132, respectively, communicate with second ends of the first and second resistors 126 and 128, respectively.

Second ends of the third and fourth resistors 130 and 132, respectively, communicate with the control module 40. The first and second bias resistances 110 and 112, respectively, include fifth and sixth resistors 134 and 136, respectively. A first end of the fifth resistor 134 communicates with a second end of the third resistor 130, and a second end of the fifth resistor 134 communicates with the second end of the first adjustable resistor 122. A first end of the sixth resistor 136 communicates with the second end of the fourth resistor 132, and a second end of the sixth resistor 136 communicates with the second end of the second adjustable resistor 124. In an exemplary embodiment, the fifth and sixth resistors 134 and 136, respectively, are 220 kΩ and have tolerances that are approximately equal to 7.0%.

Referring now to FIG. 5, the vehicle control system of the present invention diagnoses a short-circuit condition between the first and second throttle position sensors 62 and 64, respectively, without the use of a short-circuit switch. Additionally, the short-circuit detection process does not interfere with vehicle system diagnostics that utilize position signals 66 and 68 from the throttle position sensors 62 and 64. This is accomplished by utilizing predetermined resistor values and tolerances for the sensor resistances 94 and 96 and the series resistances 98 and 100. Additionally, sufficient knowledge of the range of possible contact resistances 102 and 104 increases the reliability of the short-circuit detection process.

As discussed above, the value of the first position signal 66 decreases at a first rate while the value of the second position signal 68 increases at the same rate as the throttle blade 52 moves between the minimum and maximum positions. During a short-circuit condition between the throttle position sensors 62 and 64, the values of the position signals 66 and 68 are equal. Therefore, the values of the first and second sensor resistances 94 and 96, respectively, and the values of the first and second series resistances 98 and 100, respectively, are set so that they are not equal. Since the values of the position signals 66 and 68 simultaneously increase/decrease on the same scale, this decreases the likelihood that the values of the position signals 66 and 68 are equal during normal operations.

FIG. 5 illustrates first exemplary resistor values for the sensor resistances 94 and 96 and series resistances 98 and 100. As discussed above, the sensor resistances 94 and 96 and series resistances 98 and 100 may be generated by an ink deposition process. Resistors generated by an ink deposition process typically have an appreciable tolerance from a nominal value. For example, resistors generated by an ink deposition process may have a tolerance of 20% from a nominal value.

The first sensor resistance 94 has a nominal value of 3300Ω and a tolerance of 18.18%. This corresponds with a minimum value of 2700Ω and a maximum value of 3900Ω. The first series resistance 98 has a nominal value of 1500Ω and a tolerance of 20.0%. This corresponds with a minimum value of 1200Ω and a maximum value of 1800Ω.

The second sensor resistance 96 has a nominal value of 2200Ω and a tolerance of 18.18%. This corresponds with a minimum value of 1800Ω and a maximum value of 2600Ω. The second series resistance 100 has a nominal value of 750Ω and a tolerance of 24.0%. This corresponds with a minimum value of 570Ω and a maximum value of 930Ω. An observed value for the contact resistances 102 and 104 ranges between 150Ω and 1500Ω. To ensure that the values of the first and second sensor resistances 94 and 96, respectively, are not equal, a ratio of the first sensor resistance 94 to the second sensor resistance 96 that is equal to 1.50 is employed. Likewise, a ratio of the first series resistance 98 to the second series resistance 100 that is equal to 2.11 is employed.

The table in FIG. 5 includes mid-range values of the first and second sensor resistances 94 and 96, respectively. For example, the mid-range values for the first sensor resistance 94 range from 1350Ω to 1950Ω with a nominal value of 1650Ω. The mid-range values of the second sensor resistance 96 range from 900Ω to 1300Ω with a nominal value of 1100Ω. The mid-range values indicate approximate resistances that are detected at the adjustable terminals of the sensor resistances 94 and 96 during the middle of the sensor resistance ranges.

If identical values were used for the first and second sensor resistances 94 and 96, respectively, the mid-range values of the first and second sensor resistances 94 and 96 would be approximately equal, which would complicate short-circuit detection in the mid-range. Therefore, the sensor resistances 94 and 96 are intentionally set at different values so that the mid-range values do not overlap. However, it is possible for the values of the sensor resistances 94 and 96 to be very close due to the tolerances of the sensor resistances 94 and 96. For example, the minimum value of the first sensor resistance is equal to 2700Ω and the maximum value of the second sensor resistance is equal to 2600Ω. Even though the two values are not equal, the values may be close enough to disrupt short-circuit detection in the mid-range of resistance values.

Referring now to FIG. 6, second exemplary resistor values for the sensor resistances 94 and 96 and series resistances 98 and 100 are shown. The first sensor resistance 94 has a nominal value of 2500Ω and a tolerance of 20.0%. This corresponds with a minimum value of 2000Ω and a maximum value of 3000Ω. The first series resistance 98 has a nominal value of 750Ω and a tolerance of 20.0%. This corresponds with a minimum value of 600Ω and a maximum value of 900Ω. A ratio of the first sensor resistance 94 to the second sensor resistance 96 and of the first series resistance 98 to the second series resistance 100 that is equal to 0.50 is employed. Therefore, the second sensor resistance 96 has a nominal value of 5000Ω and a tolerance of 20.0%.

This corresponds to a minimum value of 4000Ω and a maximum value of 6000Ω. The second series resistance 100 has a nominal value of 1500Ω and a tolerance of 20.0%. This corresponds with a minimum value of 1200Ω and a maximum value of 1800Ω. An increased contact resistance range is utilized to account for a greater variation in the values of the contact resistances 102 and 104. The contact resistances 102 and 104 range from 150Ω to 2500Ω.

As illustrated in FIG. 6, there is a 1000Ω separation between the maximum value of the first sensor resistance 94 and the minimum value of the second sensor resistance 96.

Therefore, a suitable ratio between the first and second sensor resistances 94 and 96, respectively, and the first and second series resistances 98 and 100, respectively, is utilized to account for variations due to the tolerances of the resistor values. When the tolerance of the resistor values is approximately equal to 20.0%, a ratio of 0.67 provides limited separation between the ranges of resistor values as illustrated in FIG. 5. When a ratio of 0.50 is utilized with a tolerance of 20.0%, a more suitable separation between the possible values of the sensor resistances 94 and 96 is achieved. Additionally, a ratio less than 0.50 may also be implemented. However, too great a separation between resistor values of the sensor resistances 94 and 96 can cause adverse affects due to noise.

The resistor values of the series resistances 98 and 100 are also selected to prevent damage to the components of the throttle position sensors 62 and 64 during a short-to-battery condition. In an exemplary embodiment, the lowest achievable value for the sensor resistances 94 and 96 is set equal to 7% of the respective maximum values of the sensor resistances 94 and 96. Therefore, the components of the throttle position sensors 62 and 64 are designed to withstand voltages generated by respective combinations of 7% of the maximum value for the sensor resistances 94 and 96, the series resistances 98 and 100, and the contact resistances 102 and 104 during a short-to-battery condition.

The resistor values of the first and second sensor resistances 94 and 96, respectively, do not overlap during normal operations. Therefore, the control module 40 detects a short-circuit condition between the throttle position sensors 62 and 64 by reading the values of the position signals 66 and 68. The control module 40 detects a short-circuit condition when the difference between the values of the position signals 66 and 68 is less than a predetermined valued. Depending on the polarities of values from the position signals 66 and 68, the control module 40 may invert one of the values before comparing the first and second position signals 66 and 68.

In the event that the control module 40 detects a short-circuit condition between the throttle position sensors 62 and 64, the control module 40 utilizes the throttle position sensor 62 or 64 that generates a position signal 66 or 68 with a higher value for system control. This avoids adverse effects caused by correlation errors. Additionally, in an exemplary embodiment, the control module 40 only utilizes the value of the first position signal 66 during normal operations and while no alarm indicators are activated. In this case, the second sensor resistance 96 is utilized primarily for short-circuit detection and redundancy checks between the throttle position sensors 62 and 64.

Figure 7:
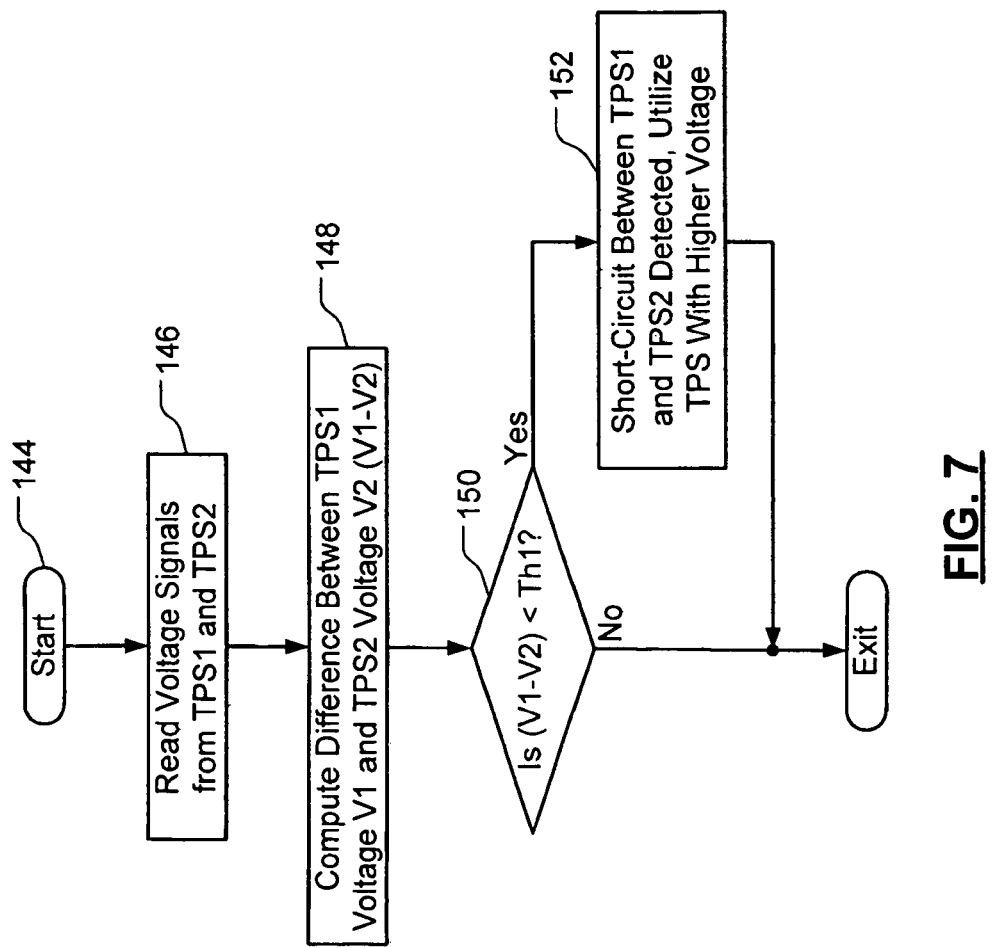
FIG. 7 is a flowchart illustrating steps performed by the control module of FIG. 3 to detect a short-circuit condition between the throttle position sensors.

Referring now to FIG. 7, a short-circuit detection algorithm begins in step 144. In step 146, the control module 40 reads the values of the voltages signals from the throttle position sensors 62 and 64. In step 148, the control module 40 computes the difference between the values of the position signals 66 and 68. Prior to computing the difference in step 148, the control module 40 may adjust one or more of the position values, if necessary. In step 150, control determines whether the difference between the values of the position signals 66 and 68 is less than a predetermined value.

If false, control ends. If true, control proceeds to step 152. in step 152, the control module 40 detects a short-circuit condition between the throttle position sensors 62 and 64, activates an alarm indicator, and control ends. In step 152, the control module 40 also utilizes the throttle position sensor that generates the position signal 66 or 68 having the greatest value for system control.

Figure 8:
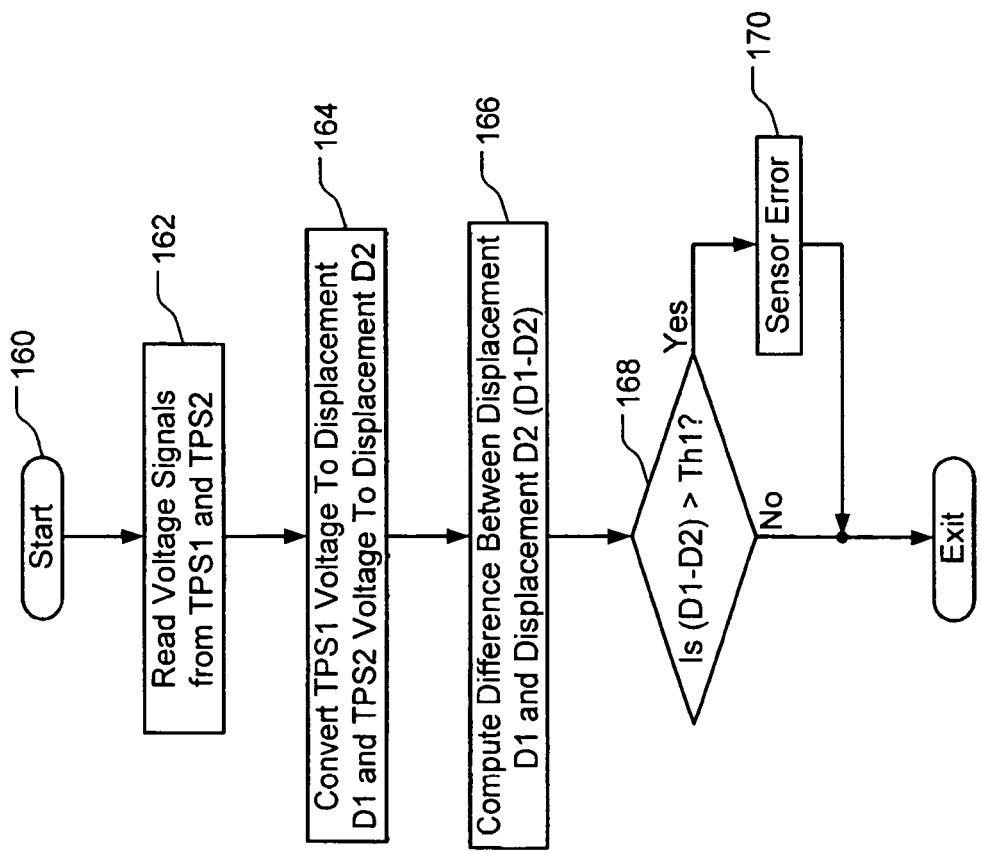
FIG. 8 is a flowchart illustrating steps performed by the control module of FIG. 3 to verify redundant position sensing by the throttle position sensors.

Referring now to FIG. 8, a sensor redundancy algorithm begins in step 160. In step 162, the control module 40 reads the values of the position signals 66 and 68 from the throttle position sensors 62 and 64. In step 162, the control module 40 converts the value of the first position signal 66 into a first displacement vale and the value of the second position signal 68 into a second displacement value. In step 166, the control module 40 computes the difference between the first and second displacement values. In step 168, control determines whether the difference between the displacement values is greater than a predetermined value. If false, control ends. If true, control proceeds to step 170. In step 170, the control module 40 activates an alarm indicator and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method comprising:
connecting first and second sensor resistances to a vehicle device that varies between a minimum position and a maximum position, wherein the minimum position corresponds to a minimum resistance of the first sensor resistance and a maximum resistance of the second sensor resistance, and wherein the maximum position corresponds to a maximum resistance of the first sensor resistance and a minimum resistance of the second sensor resistance;
monotonically increasing a resistance value of the first sensor resistance and monotonically decreasing a resistance value of the second sensor resistance as the vehicle device moves from the minimum position to the maximum position, wherein the maximum resistance of the second sensor resistance is at least 1.5 times the maximum resistance of the first sensor resistance, and wherein a mid-point resistance of the second sensor is at least 1.5 times a mid-point resistance of the first sensor;
determining first and second measured positions of the vehicle device based on the resistance values of the first and second sensor resistances, respectively; and
controlling a vehicle system based on the first and second measured positions.

2. The method of claim 1 wherein the vehicle device is a throttle blade of a vehicle that includes the vehicle system.

3. The method of claim 1 wherein the maximum resistance of the second sensor resistance is at least two times the maximum resistance of the first sensor resistance.

4. The method of claim 1 wherein the maximum resistance of the first sensor resistance varies within a first range based upon a first manufacturing tolerance, the maximum resistance of the second sensor resistance varies within a second range based upon a second manufacturing tolerance, and the first and second ranges do not overlap.

5. The method of claim 1 further comprising activating an alarm indicator when a difference between the first and second measured positions is greater than a predetermined value.

6. The method of claim 5 further comprising controlling the vehicle system based on the first measured position without using the second measured position until the alarm indicator is activated.

7. The method of claim 1 further comprising activating an alarm indicator when a difference between the resistance values of the first and second sensor resistances is less than a predetermined value.

8. The method of claim 7 further comprising controlling the vehicle system based on the first measured position without using the second measured position until the alarm indicator is activated.

9. The method of claim 1 further comprising determining the resistance values of the first and second sensor resistances based on first and second voltages measured from the first and second sensor resistances, respectively.

10. The method of claim 9 further comprising activating an alarm indicator when a difference between the first and second voltages is less than a predetermined value.

11. The method of claim 10 further comprising controlling the vehicle system based on the first measured position without using the second measured position until the alarm indicator is activated.

12. The method of claim 1 wherein the first and second sensor resistances are formed from resistive ink.

* * * * *